(12) United States Patent
Frem et al.

(10) Patent No.: US 9,658,736 B2
(45) Date of Patent: May 23, 2017

(54) CONTRAST-ORIENTED CURSOR PRESENTATION

(71) Applicant: Microsoft Technology Licensing, LLC, Redmond, WA (US)

(72) Inventors: Peter Frem, Bothell, WA (US); Tyler Robert Adams, Seattle, WA (US); Christopher Maloney, San Francisco, CA (US); Kimberly Shay Koenig, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/730,455

(22) Filed: Jun. 4, 2015

(65) Prior Publication Data

US 2016/0357398 A1    Dec. 8, 2016

(51) Int. Cl.
*G09G 5/02* (2006.01)
*G09G 5/08* (2006.01)
*G06F 3/048* (2013.01)
*H04N 1/60* (2006.01)
*H04N 1/46* (2006.01)
(Continued)

(52) U.S. Cl.
CPC .......... *G06F 3/04812* (2013.01); *G06F 3/038* (2013.01); *G06F 3/0481* (2013.01); *G09G 5/026* (2013.01); *G09G 5/08* (2013.01); *G06F 2203/04801* (2013.01); *G06F 2203/04804* (2013.01); *G09G 2340/06* (2013.01)

(58) Field of Classification Search
CPC combination set(s) only.
See application file for complete search history.

(56) References Cited

U.S. PATENT DOCUMENTS 5,196,837 A    3/1993   Shoji et al.
5,270,688 A *  12/1993  Dawson ............... G09G 5/08
                                                345/639
5,410,331 A    4/1995   Schuneman
(Continued)

OTHER PUBLICATIONS

"How to create animated cursors—part 2", Published on: Jun. 23, 2004, pp. 5 Available at: http://www.anicursor.com/tutorial2.html.
(Continued)

*Primary Examiner* — Wesner Sajous
(74) *Attorney, Agent, or Firm* — Christopher J. Volkmann; Kelly, Holt & Christenson, PLLC

(57) ABSTRACT

Many devices present a cursor on a display. In order to facilitate the user's visual identification and tracking of the location of the cursor, the device may present the cursor with many visual variations, such as blinking the cursor, or selecting colors for the cursor that contrast with the background. However, these techniques may only marginally increase the visibility of the cursor in some circumstances, and/or may appear visually unappealing to the user. Presented herein are techniques for presenting a cursor on the display as a first cursor layer in a first cursor color that blends with the background color, and, under the first layer, a second cursor layer in a contrasting cursor color with respect to the first cursor color and the background. The device may also periodically remove the first layer to display the contrasting second layer and to indicate the location of the cursor to the user.

20 Claims, 8 Drawing Sheets

(51) Int. Cl.
*G06F 3/0481* (2013.01)
*G06F 3/038* (2013.01)

(56) References Cited

U.S. PATENT DOCUMENTS

| | | | | |
|---|---|---|---|---|
| 5,629,720 | A * | 5/1997 | Cherry | G09G 5/06 345/601 |
| 5,838,334 | A * | 11/1998 | Dye | G06F 12/08 345/501 |
| 6,486,894 | B1 * | 11/2002 | Abdelhadi | G06F 3/04812 345/161 |
| 8,184,096 | B2 | 5/2012 | Louch | |
| 8,661,365 | B2 * | 2/2014 | Yoo | H04N 5/44591 715/788 |
| 2002/0059308 | A1 * | 5/2002 | Kawashima | G06F 17/30873 |
| 2003/0189819 | A1 * | 10/2003 | Furuya | G01D 13/28 362/23.2 |
| 2005/0024381 | A1 * | 2/2005 | Dotson | G09G 5/08 345/600 |
| 2007/0216656 | A1 * | 9/2007 | Chen | G06F 3/0481 345/173 |
| 2013/0135288 | A1 | 5/2013 | King et al. | |

OTHER PUBLICATIONS

Dohm, Lee, "White Cursor Atom Package", Retrieved on: Sep. 17, 2014, pp. 1 Available at: https://atom.io/packages/white-cursor.

"Windows: color of the mouse pointer", Published on: Mar. 4, 2012, pp. 2 Available at: http://community.slickedit.com/index.php?topic=7783.0.

"Can't see brush curser", Published on: Aug. 3, 2011, pp. 8 Available at: https://forums.adobe.com/thread/885916?start=0&tstart=0.

"Microsoft Windows Cursor and Icon", Published on: Jan. 4, 2003, pp. 9 Available at: http://oreilly.com/www/centers/gff/formats/mic-cur/index.htm.

* cited by examiner

CONTRAST-ORIENTED CURSOR PRESENTATION

BACKGROUND

Within the field of computing, many scenarios involve the presentation of a cursor on a display of a device. In many such scenarios, difficulties may arise due to the visibility of the cursor on the display; e.g., a user may have difficulty identifying the location of the cursor, and/or tracking movement of the cursor, if the cursor blends into a display background, including a "wallpaper" or static image presented on the background and/or a user interface element such as a window.

Various techniques may be utilized to facilitate the user in determining the location of the cursor. As a first example, the device may cause the cursor to blink at a specified frequency, or to rotate through various colors. As a second example, the device may detect the background color, and may present respective portions of the cursor in inverse colors; e.g., when the cursor is positioned over a black background, the device may present a white cursor, and vice versa. These and other techniques may draw the user's eye to the location of the cursor, and may therefore enable the user to interact with the device via the pointer.

Some techniques for presenting the cursor may utilize some framework hardware or software capabilities of the device. For example, a device may provide hardware and/or application library support for alpha blending to provide a smooth transition between cursor states, and the cursor may be presented by invoking such support to present the cursor with an inverse alpha blend. Because such underlying support may be more highly optimized for the other hardware and/or software capabilities of the device, and/or may integrate such alpha blending techniques at a lower level (e.g., a part of the display device driver), utilizing such resources may provide enhanced performance (e.g., reduced cursor movement latency and/or computational use) than ad-hoc alpha blending techniques developed specifically for and applied specifically to the display of the cursor.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While various techniques may be utilized to draw the attention of the user to a cursor location of the cursor, some of these techniques may be disadvantageous. As a first such example, devices that always present a high-contrast cursor, such as always presenting a bright white cursor on a dark background, may be visually unappealing to the user. As a second such example, a blinking cursor may still be difficult to detect against a non-contrasting background; e.g., a dark-colored cursor over a dark-colored background may not be visible even with a high blink rate. As a third such example, a entire cursor that color-contrasts with the background may still be difficult to locate if the background features highly contrasting colors; e.g., a cursor that contrasts with a camouflage-designed background may also appear camouflaged, and therefore difficult to see, even if the contrasting colors of the cursor are updated as the cursor moves over the background. As a fourth such example, while some devices may provide support for some cursor display techniques, other devices may not. An application that depends on the availability of such support for the presentation of the cursor may result in an absence of any contrast-enhancing technique for the cursor that interacts with the application on devices lacking such support, and/or may result in error messages from broken dependencies.

Presented herein are techniques for presenting a cursor on a display of a device that may address some of these observations. In accordance with these techniques, a device may be configured to present the cursor at a cursor location of the display in the following manner. The device may present, at the cursor location, a first cursor layer of the cursor in a first cursor color. The device may also present, at the cursor location and under the first cursor layer, a second cursor layer of the cursor, in a contrasting cursor color that contrasts with the first cursor color. The device may also periodically remove the first cursor layer, thus revealing the second cursor layer. The removing of the first cursor layer may be a discrete step (e.g., alternating between the first cursor layer presented over the second cursor layer, and only presenting the second cursor layer) or continuous (e.g., incrementally and/or smoothly fading between presenting the first cursor layer over the second cursor layer, and presenting only the second cursor layer). In this manner, the device may present the cursor in a manner that facilitates the user's identification and/or tracking of the mouse movement of the cursor in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
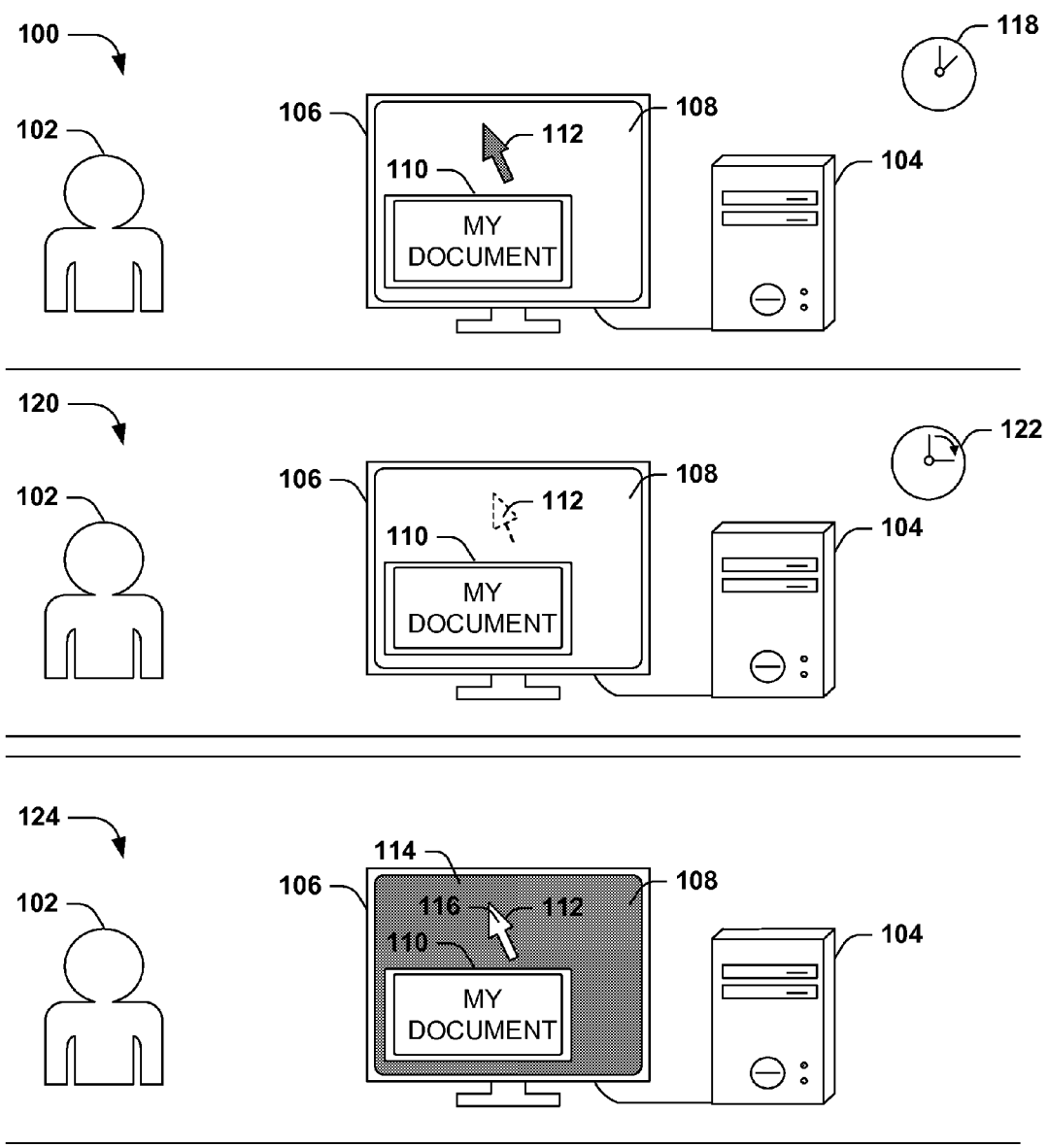
FIG. 1 is an illustration of an example scenario featuring a presentation of a cursor on a display.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring two techniques for displaying a cursor 112 on a display 106 of a device 104. In this example scenario, at a first time 118, the device 104 presents to a user 102 a display 106 featuring various elements as a background 108, such as a selected color or color gradient; a static or animating "wallpaper" image; and/or a set of user interface elements 110, such as icons or "gadgets" positioned on a desktop, as well as elements that are associated with an application, such as a menu or window that displays the contents of a file. More particularly, the appearance of the cursor 112 may be specified by the device 104 and/or selected by the user 102 (e.g., as a solid color or an image, and/or as one of several available shapes and sizes).

In such example scenarios 100, difficulties may arise with the presentation of the cursor 112, wherein the user 102 may have difficulty identifying the location of the cursor 112 on the display 106; distinguishing between the cursor 112 and the background 108 of the display 106; and/or tracking the movement of the cursor 112 across the display 106, including over various user interface elements 110.

A first technique 120 illustrated in FIG. 1 involves periodically removing the cursor 112 from the display 106 at a second time 122, causing the cursor 112 to blink. Therefore, while the cursor 112 is stationary on a static background 108 of the display 106, the cursor 112 may stand out from the static background 108, and the attention of the user 102 may be drawn to the blinking shape that represents the cursor 112.

A second technique 124 illustrated in FIG. 1 involves presenting the cursor 112 at a cursor location 116 and with a background color 114 of the background 108 of the display 106. For example, if the background color 114 of the background 108 is dark, such as black, the cursor 112 may be presented in a white cursor color. Conversely, while presenting the cursor 112 on a light-colored background 108 such as at the first time 118, the device 104 may present the cursor in a dark cursor color, such as black. In some techniques, the specific portions of the background 108 at the location of the cursor 112 may be taken into consideration; e.g. if the user 102 moves the cursor 112 from the dark-colored background 1108 and over a light-colored user interface element 110 such as a window, the cursor color of the cursor 112 may be changed to a dark color, such as black.

As a further variation, such background contrast may be selected for different parts of the cursor 112; e.g., a first portion of the cursor 112 positioned over the dark background 108 may be shown in a light cursor color 114; and, concurrently, a second portion of the cursor 112 positioned over a light-colored user interface element 110 may be shown in a dark cursor color 114. In this manner, various techniques may be utilized to present the cursor 112 to the user 102.

In some of these techniques, the presentation of the cursor 112 may utilize some resources of the device 104. For example, some techniques may involve alpha-blending calculations, which may enable blending of colors, and which may be used to provide a partial opacity or transparency of presented images with respect to other images and/or the background 106. Because such calculations may be computationally intensive, it may be difficult and/or inefficient to utilize these techniques in a performant manner (e.g., applying alpha-blending operations to the cursor 112 during each redraw). Instead, the device 104 may provide some resources to assist with such tasks, such as support through a display device driver or the operating system, which may achieve the performance of such operations in an optimized manner and/or may alleviate ad-hoc code from applications utilizing such techniques.

However, in many such scenarios, a variety of problems may arise with the presentation of the cursor 112 that diminish the ability of the user 102 to identify the location of the cursor 112, even if such techniques as shown in the example scenario 100 of FIG. 1 are utilized.

As a first such example, if the device 104 always presents a high-contrast-colored cursor 112, the high contrast may be visually unappealing to the user 102. For example, if the cursor 112 is shown in a high-contrast color such as bright red, the cursor 112 may look garish or distracting. Similarly, if the cursor 112 blinks at a high rate, the cursor 112 may be visually distracting while the user 102 is not interested in its location.

As a second such example, some of these techniques may not increase the visibility of the cursor 112 against the background 108. As a first such example, if the first technique 120 is utilized that involves blinking the cursor 112, the cursor 112 may still not be visible positioned over a dynamic background 108, such as an animating background image or user interface element 110 that is also blinking or otherwise moving. Alternatively or additionally, choosing a color for the cursor 112 that contrasts with the background color 108 may not increase the visibility of the cursor 112 if the coloration of the background 108 is dynamic. For example, if the background 108 is depicted as high-contrast camouflage, an automatic selection of the cursor color to contrast with the background color 114 may also cause the cursor 114 to appear as high-contrast camouflage, and the cursor 112 may also inadvertently appear as camouflage, and may blend in with the background 108.

As a third such example, techniques that utilize some device resources of the device 104 to present the cursor 112, such as alpha-blending support from the processor, display device driver, or an application programming interface (API), may fail on devices 104 where such resources are not available. For example, if the display device driver does not provide support for alpha-blending operations, an application that invokes such functionality may exhibit no noticeable alpha-blending of the cursor, and therefore may provide no visual assistance in identifying the location of the cursor 112. In some scenarios, reliance upon such resources may result in an application failure, such as a system crash. These and other problems may arise from the presentation of the cursor 112 using the techniques illustrated in the example scenario 100 of FIG. 1.

B. Presented Techniques

Figure 2:
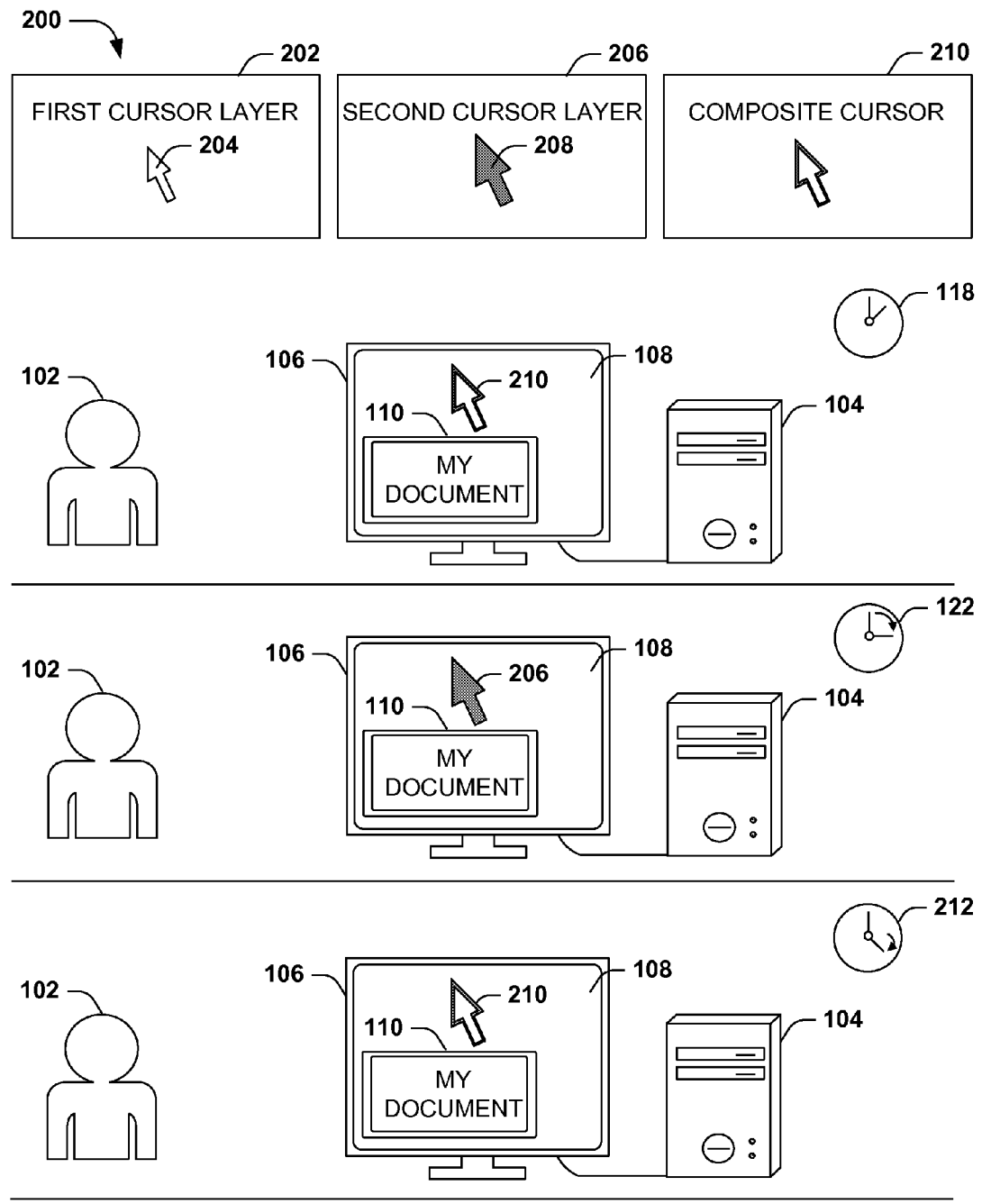
FIG. 2 is an illustration of an example scenario featuring a presentation of a cursor on a display in accordance with the techniques presented herein.

FIG. 2 presents an illustration of an example scenario 200 featuring a presentation of a cursor 112 on a display 106 of a device 104 in accordance with the techniques presented herein.

In this example scenario 200, the cursor involves a first cursor layer 202, in a first cursor color 204, and a second cursor layer 206, in a contrasting cursor color 208 that contrasts with the first cursor color 208. A composite cursor 210 is generated as the second cursor layer 206 presented under the first cursor layer 202. In some variants including the example scenario 200 of FIG. 2, the second cursor layer 206 is slightly larger than the first cursor layer 202, such as at least one pixel larger to the left, top, right, and bottom of the first cursor layer 202, such that the second cursor layer 206 is visible under the first cursor layer 202 in the composite cursor 210. Additionally, in some variants including the example scenario 200 of FIG. 2, the first cursor color 204 is selected to coordinate with a color of a background 108 of a display 106, and the contrasting cursor color 208 is selected to contrast with the color of the background 108 of the display 106.

At a first time 118, a device 104 may present on a display 106 the composite cursor 210, as the first cursor layer 202 and the second cursor layer 206 under the first cursor layer 202. At a second time 122, the device 104 may present the composite cursor 210 on the display 106 by removing the first cursor layer 202, thus revealing the portion of the second cursor layer 206 that was obscured by the first cursor layer 202. At a third time 212, the device 104 may restore the first cursor layer 202, again obscuring the second cursor layer 206 presented under the first cursor layer 202. In this manner, the device 104 may present a composite cursor 210 on the display 106 in accordance with the techniques presented herein.

C. Technical Effects

Various uses of the techniques presented herein to present a cursor on a display 106 of a device 104 may result in a variety of technical effects.

As a first technical effect, the presentation of the cursor in accordance with the techniques presented herein may present a cursor that is visually apparent to a user 102. For example, in some scenarios, the user 102 may have difficulty identifying the location of the cursor 112 on the display 106, such as where the cursor 112 blends into a background color 114, or where the cursor 112 is stationary among many other stationary visual objects on the display 106. The techniques presented herein provide a composite cursor 210 that is apparent on the display 106 in these circumstances, due to the contrasting color 208 of the second cursor layer 206 that contrasts with the first cursor color 204, and/or the cyclic hiding and replacement of the first cursor layer 202 over the second cursor layer 206.

As a second technical effect, the presentation of the cursor in accordance with the techniques presented herein may conserve computing resources, particularly in devices of limited computational power, such as mobile and embedded devices. Some devices have specialized hardware or software for graphics rendering, such as a sprite buffer that holds a bitmap to be displayed at a location on the display. A technique that causes a cursor 112 to change appearance may have to provide a continuing stream of graphics updates, such as a complete re-rendering of the bitmap for the current appearance of the cursor 112 many times per second. However, a device that simply stores the first cursor layer 202 and second cursor layer 206 in different portions of memory, such as different hardware- or software-defined sprite buffers, may simply indicate alternatively that the first cursor layer 202 is to be removed or replaced. The simplified instruction path between the cursor control module and the graphics rendering hardware may reduce the consumption of computational resources, such as processor capacity and stored power. Such savings may be comparatively small for a single iteration, but if the cursor is continuously updated many times per second for a long duration such as an entire day, the savings in computational resources may present a significant technical effect.

As a third technical effect, the alternation technique presented herein may be significantly advantageous on particular types of displays 106. For example, on an electrophoretic ("e-ink") display, animating the cursor 112 by removing and replacing the first cursor layer 208 may be achieved through a selective screen refresh of only the pixels comprising the first cursor layer 204, and may do so at a comparatively low frequency, such as twice per second. The second cursor layer 208 and other portions of the display 106 may be left alone, and may not have to be redrawn. By contrast, other techniques for drawing attention to the cursor 112, such as "mouse trails," cursor ripple effects, or more complex and/or high-frequency animation, may entail a more extensive redrawing of part or all of the display 106, which may be inefficient and costly for computational resources such as stored power.

As a fourth technical effect, the techniques presented herein may be provided as an alternative to other cursor animation techniques in order to support a wider variety of devices. For example, an application may execute on some devices that provide specialized hardware or software support for a particular type of cursor animation, such as alpha blending. However, on devices that lack such support, the presentation of the application may cause the cursor to disappear or to exhibit reduced visibility. The techniques presented herein may be provided as a backup or alternative technique on such devices in order to support the visibility of the cursor 112. At runtime, a device may determine whether or not specialized support is provided for cursor animation, and may either invoke such specialized support or utilize the techniques presented herein based on such determination. Many such technical effects may arise from various embodiments of the techniques presented herein.

D. Example Embodiments

Figure 3:
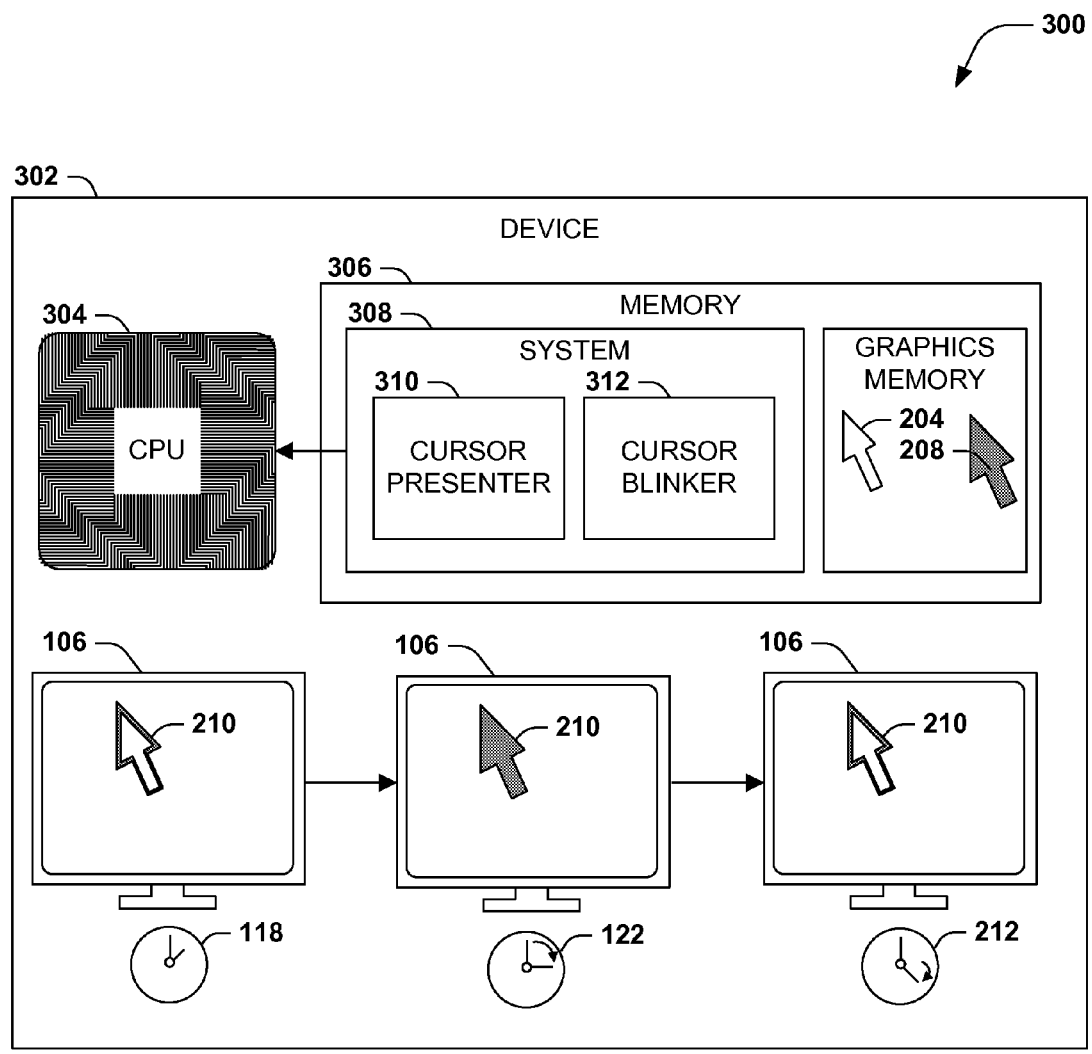
FIG. 3 is an illustration of an example device featuring an example system for presenting a cursor on a display of the example device in accordance with the techniques presented herein.

FIG. 3 presents a first example embodiment of the techniques presented herein, illustrated as an example device 302 featuring a sample system 308 that causes the example device 302 to present a cursor. In this example scenario 300, the device 302 comprises a processor 304, a display 106, and a memory 308 storing instructions that cause the device 302 to operate according to the techniques presented herein. The memory 308 may also store other components of the operating environment of the device 302; e.g., in this example scenario 300, the memory 306 comprises a graphics memory that stores images, including bitmap representations of a cursor 112. More particularly, in this example scenario 300, the memory 306 stores instructions that provide an example system 308 for presenting the cursor 112 on the display 106.

The example system 308 comprises a cursor presenter 310, which presents, at a cursor location 116, a first cursor layer 202 of the cursor 112 in a first cursor color 204. The example system 308 also comprises a cursor blinker 312, which presents, at the cursor location 116 and under the first cursor layer 202, a second cursor layer 206 of the cursor 112 in a contrasting cursor color 208 that contrasts with the first cursor color 204. The cursor blinker 312 also periodically removes the first cursor layer 202 to reveal the second cursor layer 206. For example, at a first time 118, the example system 308 may present the composite cursor 210 as the first cursor layer 202 over the second cursor layer 206; at a second time 122 after the first time 118, the example system 308 may present the composite cursor 210 as only the second cursor layer 206; and at a third time 212 after the second time 122, the example system 308 may again present the composite cursor 210 as the first cursor layer 202 over the second cursor layer 206. In this manner, the example system 308 enables the example device 302 to present the cursor 112 on the display 106 in accordance with the techniques presented herein.

Figure 4:
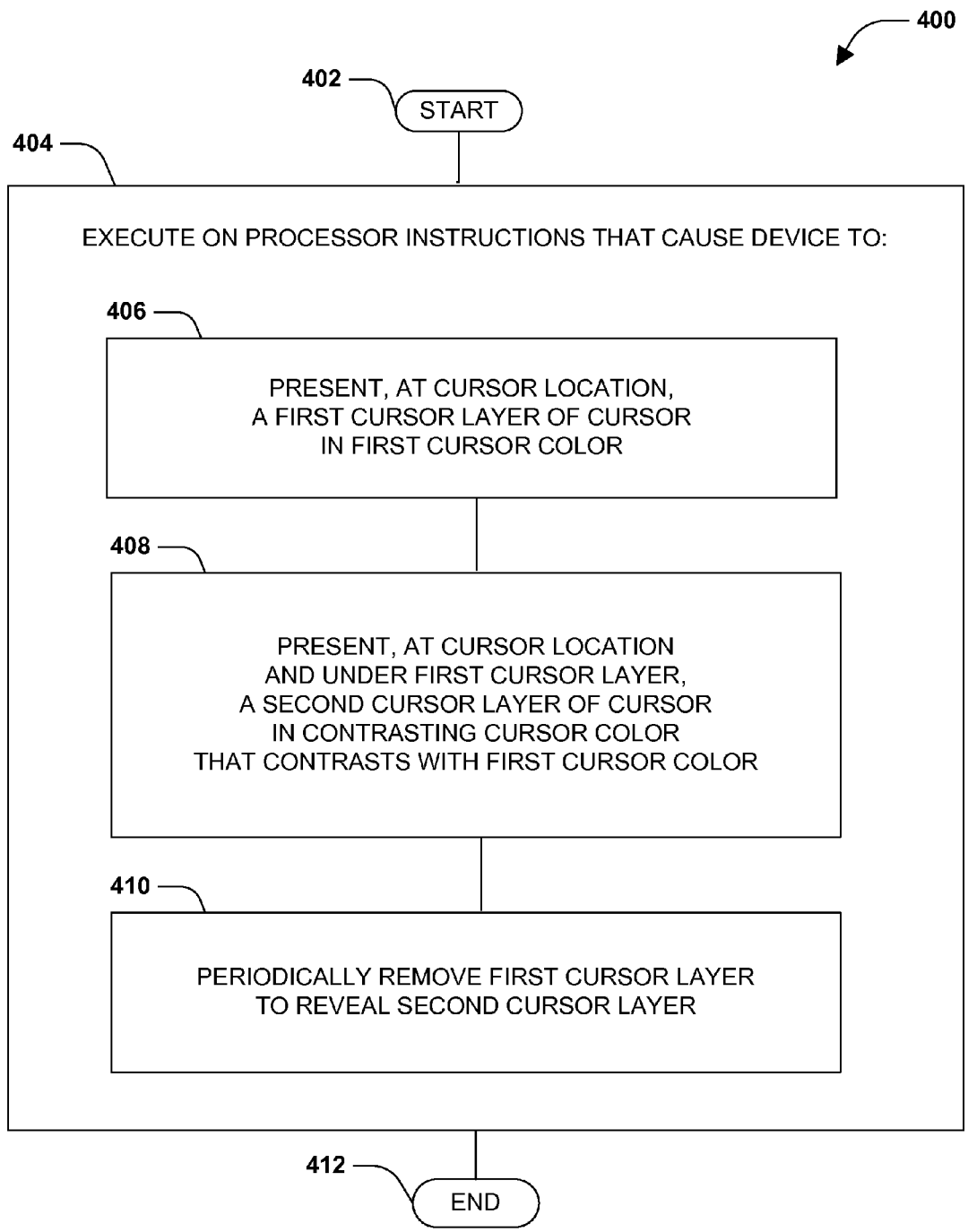
FIG. 4 is an illustration of an example method for presenting a cursor on a display of a device in accordance with the techniques presented herein.

FIG. 4 presents a second example embodiment of the techniques presented herein, illustrated as an example method 400 of presenting a cursor 112 at a cursor position on a display 106. The example method 400 may be implemented, e.g., as a set of instructions stored in a memory component of a device, such as a memory circuit, a platter of a hard disk drive, a solid-state storage device, or a magnetic or optical disc, and organized such that, when executed on a processor of the device, cause the device to operate according to the techniques presented herein.

The example method 400 begins at 402 and involves executing 404 the instructions on a processor 304 of the device. Specifically, executing 404 the instructions on the processor 304 causes the device to present 406, at the cursor location, a first cursor layer 202 of the cursor 208 in a first cursor color 204. Executing 404 the instructions on the processor 304 also causes the device to present 408, at the cursor location and under the first cursor layer 202, a second cursor layer 206 of the cursor 208 in a contrasting cursor color 208 that contrasts with the first cursor color 204. Executing 404 the instructions on the processor 304 also causes the device to periodically remove 410 the first cursor layer 202 to reveal the second cursor layer 206. In this manner, the example method 400 causes the device to present the cursor in accordance with the techniques presented herein, and so ends at 412.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
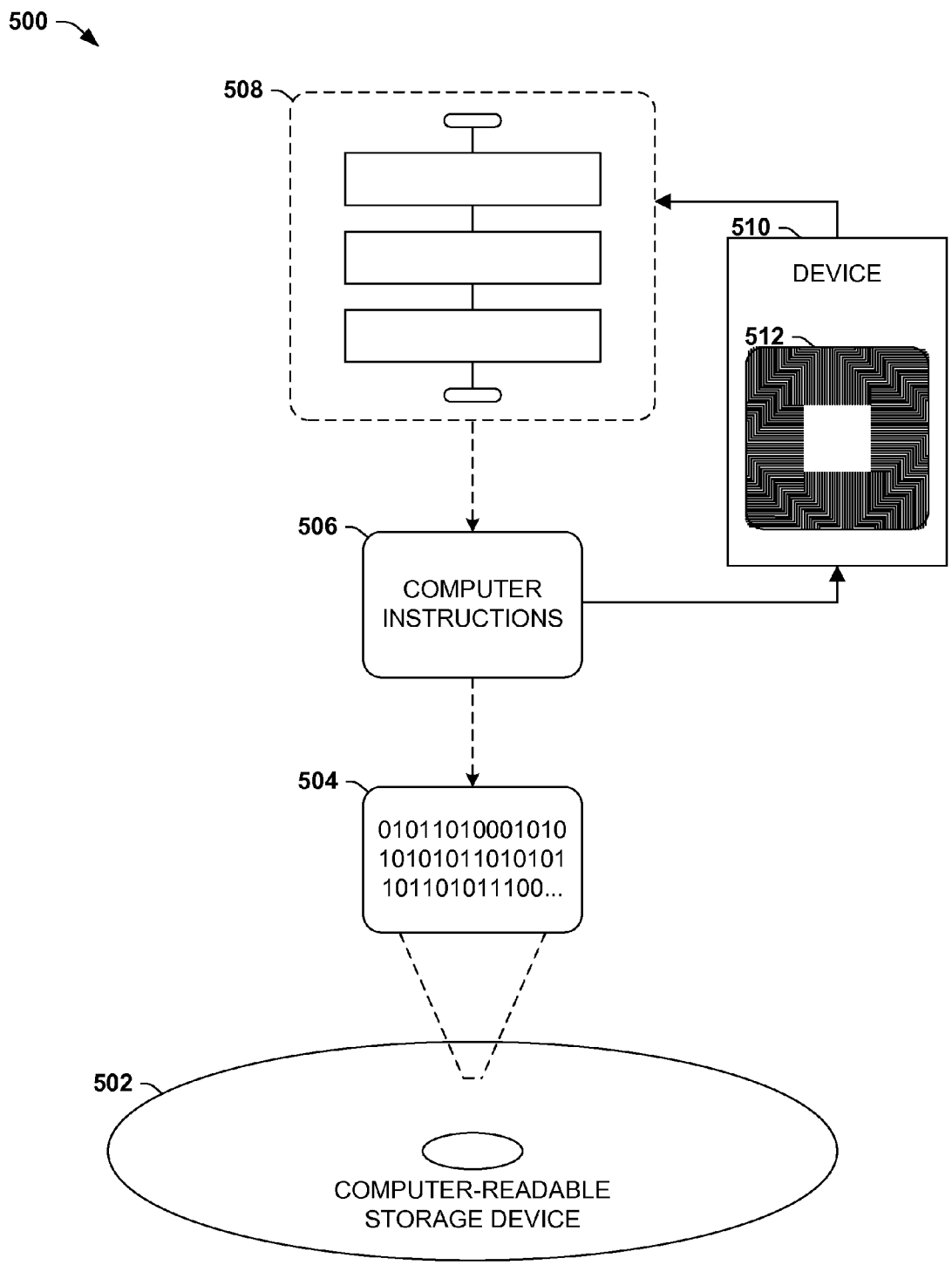
FIG. 5 is an illustration of an example computer-readable storage device storing instructions that cause a device to present a cursor on a display of the device in accordance with the techniques presented herein.
Figure 6:
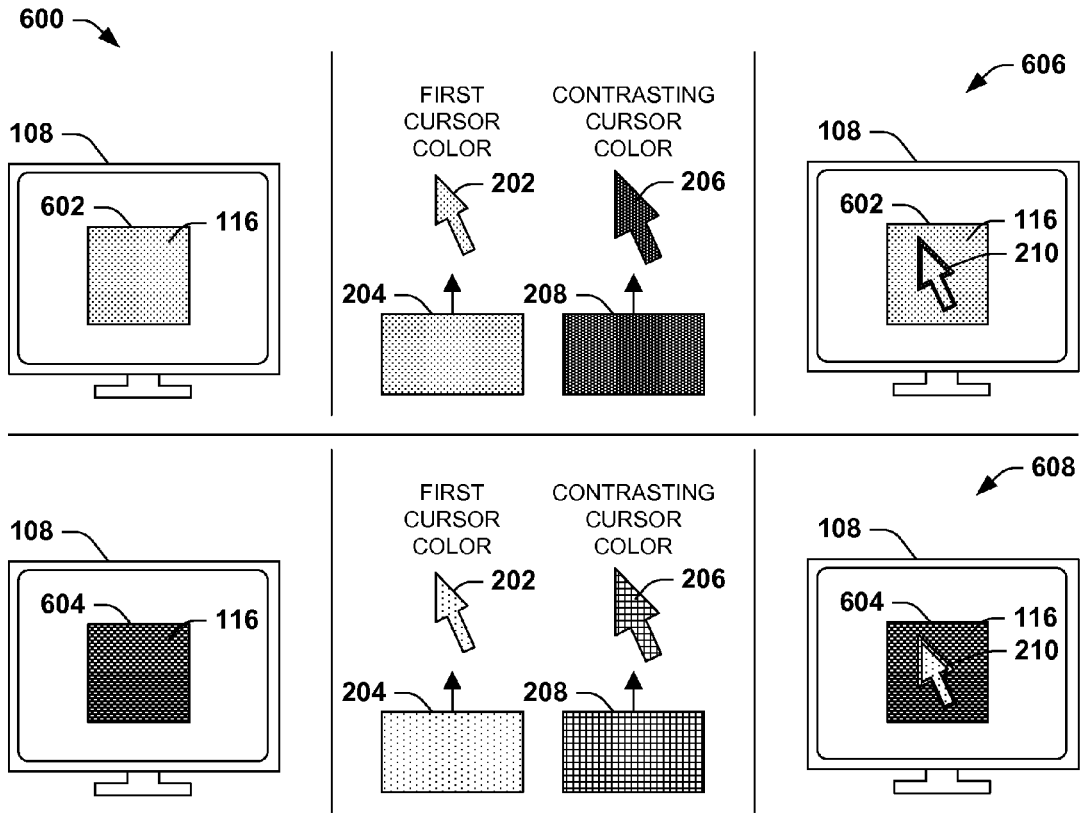
FIG. 6 is an illustration of an example scenario featuring a selection of cursor colors for a cursor presented on a display of a device in accordance with the techniques presented herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 508 of a device 510, cause the device 510 to operate according to the principles set forth herein.

In a first such embodiment, the processor-executable instructions 506 may provide a device 510 that displays a cursor 112 at a cursor location 116 of a display 106 in accordance with the techniques presented herein, such as the example device 302 in the example scenario 300 of FIG. 3.

In a second system embodiment, the processor-executable instructions 506 may provide a system that causes a device to display a cursor 112 at a cursor location 116 of a display 106 in accordance with the techniques presented herein, such as the example system 308 in the example scenario 300 of FIG. 3.

In a third such example, the processor-executable instructions 506 may cause a device to perform a method of displaying a cursor 112 at a cursor location 116 of a display 106 in accordance with the techniques presented herein, such as the example method 400 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example device 300 of FIG. 3; the example system 308 of FIG. 3; the example method 400 of FIG. 4; and/or the example computer-readable storage device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices and servers, such as workstations, laptops, tablets, mobile phones, game consoles, portable gaming devices, portable or non-portable media players, media display devices such as televisions, appliances, home automation devices, computing components integrated with a wearable device integrating such as eyewear or a watch, and supervisory control and data acquisition (SCADA) devices.

As a second variation of this third aspect, the techniques presented herein may be utilized to present cursors on a wide variety of displays 106, such as a liquid-crystal display (LCD) or light-emitting diode (LED) device connected to a computer; a display integrated with a mobile and/or wearable device, such as an eyepiece on a pair of eyewear; a visual interface of a vehicle-integrated device, such as a dashboard of an automobile; a projector that remotely projects a display of a computer; and a first device and/or a second device that collaborate to transmit a computing environment of the first device for presentation on a display of the second device.

As a third variation of this third aspect, the techniques presented herein may be utilized to present cursors for many types of pointing applications, such as a mouse, trackpad, or joystick; a touch-based or other manual gesture system; and a gaze tracking system. The techniques presented herein may also be utilized to present many types of cursors 112, such as cursors for selecting and/or identifying visual objects; navigating among visual objects; and drawing or handwriting.

As a fourth variation of this first aspect, the techniques presented herein may be utilized in conjunction with other systems for presenting the cursor 112 on the display 106. As a first such example, an application may be deployed to a device that may or may not have specialized support for presenting a cursor 112 on the display 106, such as hardware and/or software support for an inverse alpha blending of shapes presented on the display. It may be desirable for the application to utilize such specialized resources if available, and to utilize an alternative technique, such as the technique presented herein, if not. Accordingly, an embodiment of these techniques may detect whether the device supports inverse alpha blending of shapes presented on the display 106, and if so, may refrain from presenting the cursor 112 on the display 106 using the second cursor layer 206, and instead present the cursor 112 on the display 106 using inverse alpha blending; but if inverse alpha blending is not supported, the device may present the cursor 112 as a periodically appearing first cursor layer 202 over a second cursor layer 206. Many such scenarios may be devised wherein the techniques presented herein may be advantageously utilized.

E2. Cursor Appearance

A second aspect that may vary among embodiments of the techniques presented herein involves the appearance of the cursor 112 presented on the display 106.

As a first variation of this second aspect, a device may present the first layer 202 and the second layer 206 of the cursor 112 with different shapes. As a first such example, the first cursor layer 202 and the second cursor layer 206 may comprise the same shape and size, such that periodically removing the first cursor layer 202 causes the device to toggle between the first cursor layer 202 and the second cursor layer. As a second such example, the first cursor layer 202 may be smaller and/or differently shaped than the second cursor layer 206, such that at least a portion of the second cursor layer 206 appears while the first cursor layer 202 is presented over it. As one such example, the first cursor layer 202 of the composite cursor 210 may be presented in the first cursor color 204 and having a first cursor layer shape; and the second cursor layer 206 may be presented under the first cursor layer 202 in the contrasting cursor color 208, and also having a second cursor layer shape that is at least one pixel larger in at least one dimension than the first cursor layer shape of the first cursor layer 202. This variation is illustrated in the example scenario 200 of FIG. 2, wherein the second cursor layer 206 is two pixels wider and taller than the first cursor layer 202, and therefore presents an appearance of a thin border around the first cursor layer 202 when present.

As a second variation of this second aspect, the first cursor color 204 and/or contrasting cursor color 208 for the composite cursor 210 may be selected in various ways. As a first such example, one or both colors may be specified by a user 102, and/or selected as a default.

Figure 7:
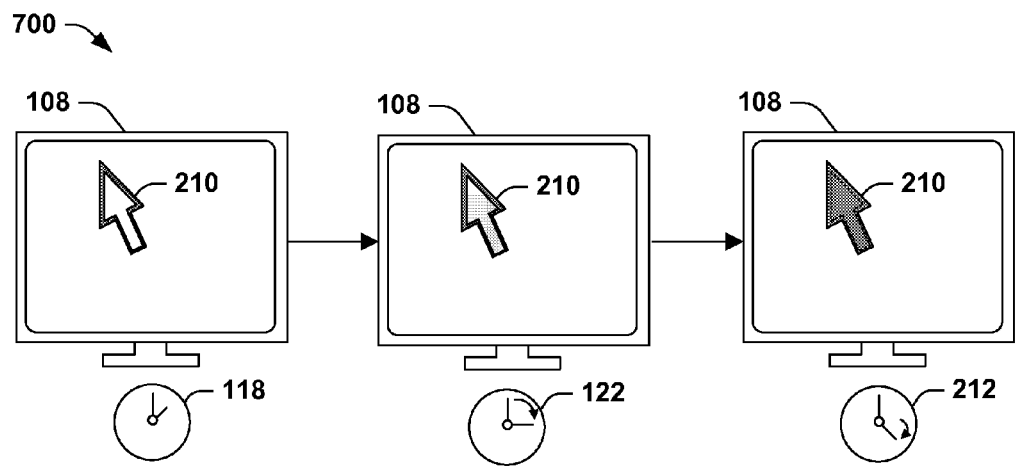
FIG. 7 is an illustration of an example scenario featuring a transition between presentations of a cursor on a display of a device in accordance with the techniques presented herein.

FIG. 7 presents an illustration of an example scenario featuring a second example of this second variation of this second aspect, wherein, while presenting a cursor 112 over a background having a background color 108, the device chooses the first cursor color 204 for the first cursor layer 202 that blends with the background color 108. As a first such example 606, the cursor 112 may appear at a cursor location 116 over a detected background color 602. The device may choose a first cursor color 204 that coordinates with the detected background color 602, including using an identical or substantially similar first cursor color 202 as compared with the light background color 602. A contrasting cursor color 206 may also be selected that contrasts with both the first cursor color 202 and the detected background color 602 at the cursor location 116. As a second such example 608, the cursor location 116 may involve a background pattern 604, and it may be desirable to choose a first cursor color 204 and/or first cursor pattern that coordinates with the background pattern 604 (e.g., presenting a light grayscale color first the first cursor color 204 that coordinates with a dark but also grayscale background pattern 604), and/or choosing a contrasting cursor color 208 and/or contrasting cursor pattern for the second cursor layer 206 that contrasts with both the first cursor color 204 and the background color 604 (e.g., a polychromatic background color). As one such example, the device may periodically detect a location-specific background color of the background at the cursor location 116 of the cursor 112, and may choose a first cursor color 204 that blends with the location-specific background color, and/or a contrasting cursor color 208 that contrasts with the location-specific background color.

As a third example of this second variation of this second aspect, a device may transition among one or more colors in a number of ways. As a first such example, the device may choose the first cursor color 204 and/or the contrasting cursor color 208 with respect to a range of the display within a distance threshold of the cursor location 116.

FIG. 7 presents an illustration of an example scenario 700 featuring a third variation of this second aspect, involving transitions among the states and/or colors of the composite cursor 210. In this example scenario 700, the composite cursor 210 periodically presents and removes the first cursor layer 202 by adjusting the opacity of the first cursor layer 202 over a range of opacities, such as between 0% and 100%. At a first time 118, the device presents the opacity of the first cursor layer 202 with 100% opacity; and at a third time 212, the device presents the opacity of the first cursor layer 202 with 0% opacity. However, at a second time 122 between the first time 118 and the third time 212, the device presents the composite cursor 210 with a 50% opacity, thereby smoothing the transition between presenting and removing the first cursor layer 202. Opacity variance may also be utilized such as while transitioning between selections of the first cursor color 204 and/or the second cursor color 208 (e.g., as the composite cursor 210 move over portions of the display 106 with different background colors 116).

As a second example of this third variation of this second aspect, the opacity of the second cursor layer 206 may vary, such as between approximately 50% and 100%. For example, the device may determine a background blend ratio of the first cursor color 204 with a background color 108 of the background, and may set the opacity of the second cursor layer 206 in inverse proportion with the background blend ratio (e.g., increasing the opacity of the second cursor layer 206 if the second cursor color 208 does not strongly contrast with the background color 108, and decreasing the opacity of the second cursor layer 206 if the second cursor color 208 strongly contrasts with the background color 108). Many such variations may be utilized to choose the appearance of the composite cursor 210 in accordance with the techniques presented herein.

E3. Periodic Removal of First Cursor Layer

A third aspect that may vary among embodiments of the techniques presented herein involves the periodic presentation and removal of the first cursor layer 202 over the second cursor layer 206.

As a first variation of this third aspect, the frequency with which the first cursor layer 202 is periodically presented over the second cursor layer 206 may be fixed, such as a user- or environment-selected frequency that does not vary as the composite cursor 210 moves within the operating environment of the device.

As a second variation of this third aspect, the period with which the first cursor layer 202 is presented over the second cursor layer 206 may vary according to various properties of the operating environment. As a first such example, the period may vary in inverse proportion with a movement rate of the cursor; e.g., if the cursor is moving quickly, the period may be decreased to facilitate visual tracking of the fast-moving composite cursor 210, and if the cursor is moving slow, the period may be increased to avoid making the composite cursor appear overly "busy."

Figure 8:
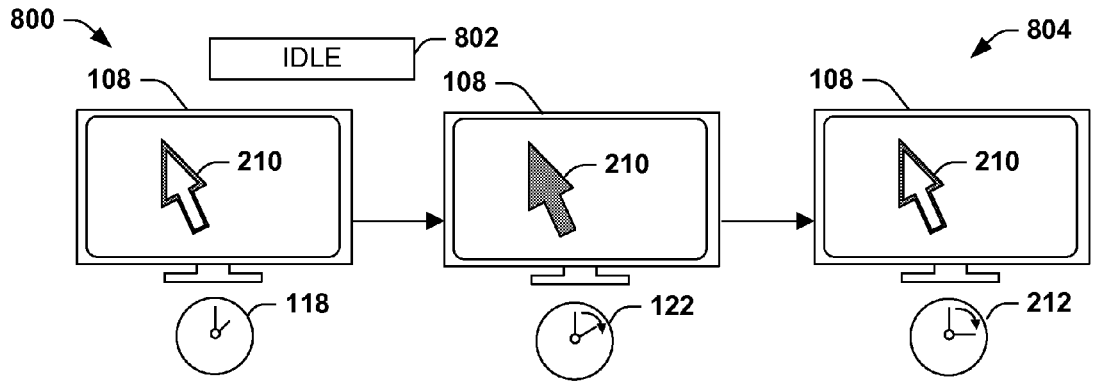
FIG. 8 is an illustration of an example scenario featuring a first example of varying a frequency of a cursor presented in a computing environment in accordance with the techniques presented herein.
Figure 8:
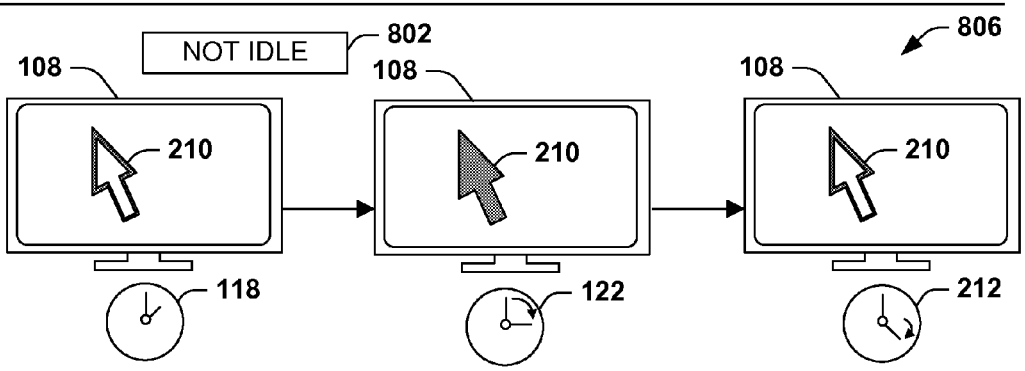

FIG. 8 presents an illustration of an example scenario 800 featuring a second example of this second variation of this third aspect, wherein the rate at which the first cursor layer 202 is presented over the second cursor layer 206 varies with a frequency selected in inverse proportion with an idle duration of the device. As a first such example 804, if the device detects an idleness 802 wherein the cursor and/or other input has been stationary, the device may increase the frequency with which the first cursor layer 202 is removed and replaced over the second cursor layer 202, e.g., in order to draw the user's attention to the cursor. As a converse example 806, if the device detects a non-idleness 802 wherein the cursor and/or other input has been stationary, the device may reduce the frequency with which the first cursor layer 202 is removed and replaced over the second cursor layer 202, e.g., in order to reduce the "busy" appearance of the cursor. Alternatively, the device may reduce the frequency upon detecting idleness 802 (e.g., to enable an idle device to appear more "quiet"), and may increase the frequency upon detecting non-idleness 802 (e.g., to facilitate visual tracking of a cursor of a device during ordinary use).

Figure 9:
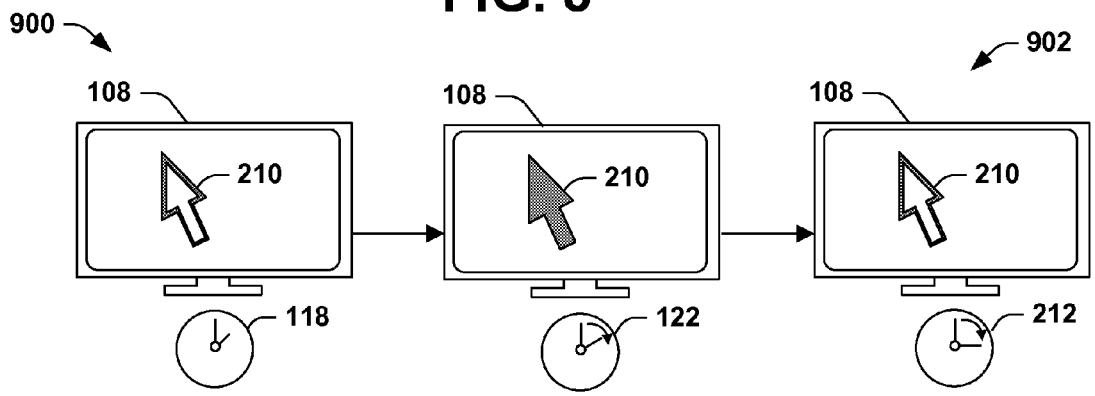
FIG. 9 is an illustration of an example scenario featuring a second example of varying a frequency of a cursor presented in a computing environment in accordance with the techniques presented herein.
Figure 9:
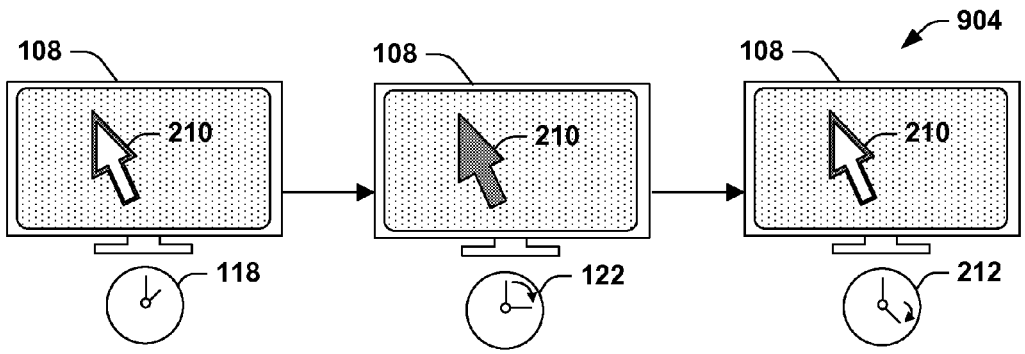

FIG. 9 presents an illustration of an example scenario 900 featuring a third example of this second variation of this third aspect, wherein the frequency with which the first cursor layer 202 is removed or replaced is selected inverse proportion with a first layer color contrast between the first cursor color 204 and a background color 108. As a first such example 902, while the composite cursor 210 appears over a background with a background color 108 that closely matches the first cursor color 210, the frequency of the first cursor layer 202 may be increased in order to provide a further assistance for visually identifying the cursor location 116 of the composite cursor 210; and as a second example 904, while the composite cursor 210 is presented at a cursor location 116 where the background color 108 does not closely match the first cursor color 204, the frequency of the first cursor layer 202 may be reduced, since less visual assistance may be desired. Many such techniques may be selected for choosing the periodicity of the first cursor layer 202 in accordance with the techniques presented herein.

F. Computing Environment

Figure 10:
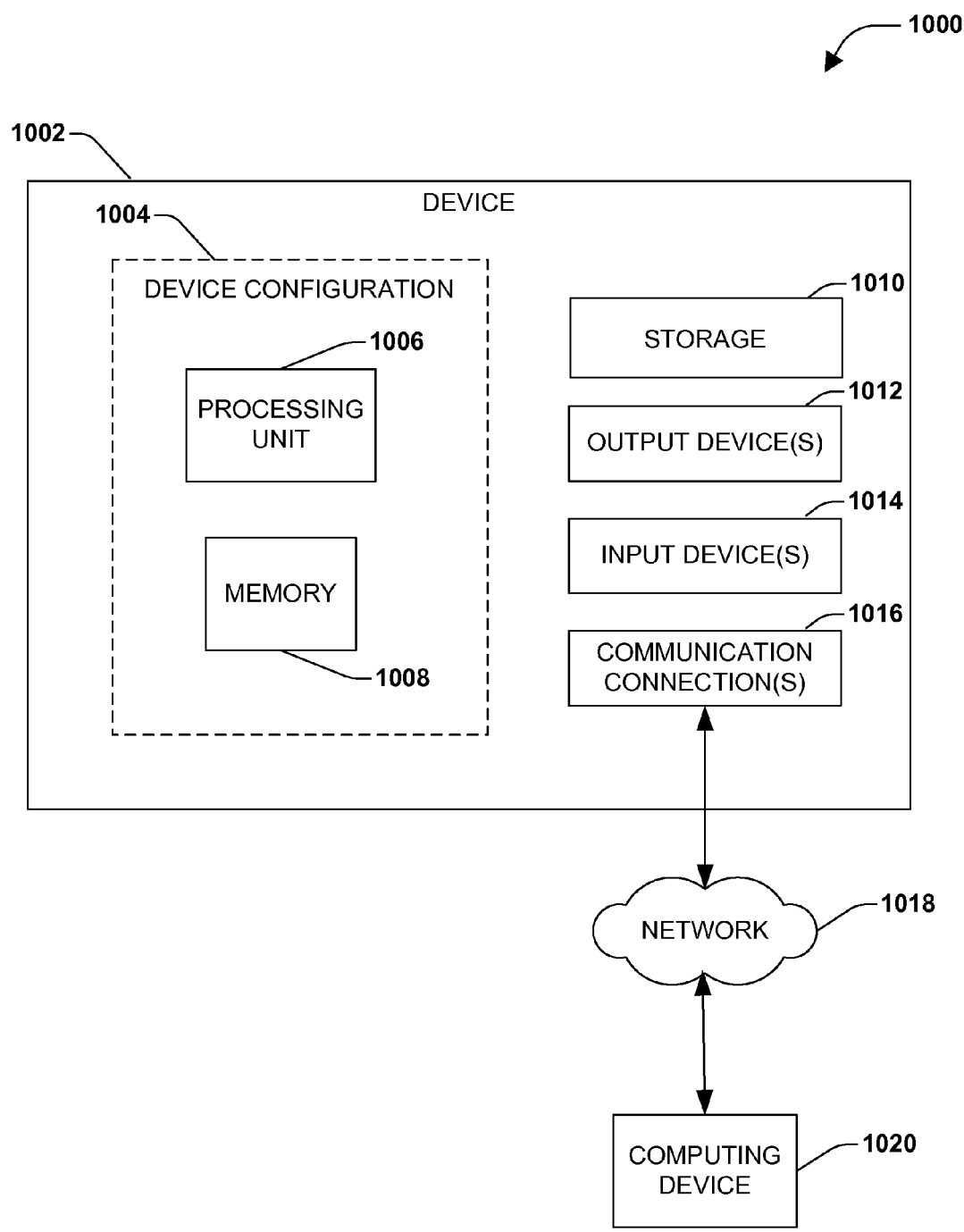
FIG. 10 is an illustration of an example computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1008 and storage 1010 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 920 accessible via network 1018 may store computer readable instructions to implement one or more embodiments provided herein. Computing device 1002 may access computing device 920 and download a part or all of the computer readable instructions for execution. Alternatively, computing device 1002 may download pieces of the computer readable instructions, as needed, or some instructions may be executed at computing device 1002 and some at computing device 920.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device comprising:
a processor;
a display; and
a memory storing instructions that, when executed on the processor, cause the device to present a cursor, by:
   presenting, at a cursor location on the display, a first cursor layer of the cursor in a first cursor color;
   presenting, at the cursor location and under the first cursor layer, a second cursor layer of the cursor in a contrasting cursor color that contrasts with the first cursor color, wherein the first cursor layer overlays at least a portion of the second cursor layer such that the portion is hidden on the display; and
   periodically removing the first cursor layer to reveal the portion of the second cursor layer on the display.

2. The device of claim 1, wherein executing the instructions in the memory further causes the device to:
   detect whether the device supports inverse alpha blending of shapes presented on the display; and
   responsive to detecting that the device supports inverse alpha blending:
      refrain from presenting the cursor on the display using the second cursor layer; and
      present the cursor on the display using inverse alpha blending.

3. The device of claim 1, wherein:
presenting the first cursor layer further comprises:
   presenting, at the cursor location, the first cursor layer of the cursor in the first cursor color and having a first cursor layer shape; and
present the second cursor layer further comprises:
   presenting, at the cursor location and under the first cursor layer, the second cursor layer in the contrasting cursor color and having a second cursor layer shape that is at least one pixel larger in at least one dimension than the first cursor layer shape.

4. The device of claim 1, wherein:
the cursor is presented over a background having a background color; and
executing the instructions in the memory further causes the device to choose the first cursor color for the first cursor layer that blends with the background color.

5. The device of claim 4, wherein choosing the first cursor color further comprises:
periodically detecting a location-specific background color of the background at the cursor location of the cursor; and
choosing the first cursor color to blend with the location-specific background color.

6. The system of claim 5, wherein:
detecting the location-specific background color further comprises:
   over a range of the display within a distance threshold of the cursor location, detecting a color average of colors presented within the range; and
selecting the first cursor color further comprises:
   choosing the first cursor color to blend with the color average of the colors presented within the range.

7. The device of claim 1, wherein:
the cursor is presented over a background having a background color; and
executing the instructions in the memory further causes the device to choose the contrasting cursor color for the second cursor layer that contrasts with the background color.

8. The device of claim 7, wherein choosing the first cursor color further comprises:
periodically detecting a location-specific background color of the background at the cursor location of the cursor; and
choosing the contrasting cursor color to contrast with the location-specific background color.

9. The device of claim 1, wherein presenting the second cursor layer further comprises:
setting an opacity of the second cursor layer between approximately 50% and 100%.

10. The device of claim 9, wherein:
executing the instructions on the processor further causes the device to determine a background blend ratio of the first cursor color with a background color of the background; and
setting the opacity of the second cursor layer further comprises:
   setting the opacity of the second cursor layer in inverse proportion with the background blend ratio.

11. A system for presenting a cursor at a cursor location of a display of a device having a processor, the system comprising:
a memory storing instructions that, when executed by the processor, cause the device to:
   present, at the cursor location of the device, a first cursor layer of the cursor in a first cursor color;
   present, at the cursor location and under the first cursor layer, a second cursor layer of the cursor in a contrasting cursor color that contrasts with the first cursor color, wherein the first cursor layer overlays at least a portion of the second cursor layer such that the portion is hidden on the display; and
   periodically remove the first cursor layer to reveal the portion of the second cursor layer on the display.

12. The system of claim 11, wherein:
the cursor is presented over a background having a background color; and
the instructions stored in the memory, when executed by the processor, further cause the device to:
   choose the first cursor color for the first cursor layer that blends with the background color; and
   choose the contrasting cursor color for the second cursor layer that contrasts with the background color.

13. The system of claim 11, wherein presenting the second cursor layer further comprises: setting an opacity of the second cursor layer between approximately 50% and 100%.

14. The system of claim 13, wherein:
executing the instructions on the processor further causes the device to determine a background blend ratio of the first cursor color with a background color of the background; and
setting the opacity of the second cursor layer further comprises:
  setting the opacity of the second cursor layer in inverse proportion with the background blend ratio.

15. The system of claim 11, wherein periodically removing the first cursor layer further comprises: further varying an opacity of the first cursor layer between 0% and 100%.

16. The system of claim 15, wherein periodically removing the first cursor layer further comprises:
periodically removing the first cursor layer with a frequency selected in inverse proportion with a movement rate of the cursor.

17. The system of claim 15, wherein periodically removing the first cursor layer further comprises:
periodically removing the first cursor layer with a frequency selected in inverse proportion with an idle duration of the device.

18. The system of claim 15, wherein:
the instructions stored in the memory, when executed on the processor, further cause the device to compare the first layer color with a background color of a background of the display to identify a first layer color contrast with respect to the background color; and
periodically removing the first cursor layer further comprises:
  periodically removing the first cursor layer with a frequency selected in inverse proportion with the first layer color contrast.

19. A method of presenting a cursor at a location on a display of a device having a processor, the method comprising:
executing, on the processor, instructions that cause the device to:
  present, at the cursor location, a first cursor layer of the cursor in a first cursor color;
  present, at the cursor location and under the first cursor layer, a second cursor layer of the cursor in a contrasting cursor color that contrasts with the first cursor color; and
  periodically remove the first cursor layer to reveal the second cursor layer.

20. The method of claim 19, wherein executing the instructions further causes the device to:
detect an idle duration of the device; and
varying an opacity of at least one of the first layer and the second layer in inverse proportion with the idle duration of the device.

* * * * *